United States Patent
Mizuno et al.

(10) Patent No.: US 8,105,170 B2
(45) Date of Patent: Jan. 31, 2012

(54) CROSS SHAFT JOINT

(75) Inventors: Koichiro Mizuno, Kashiwara (JP); Kouji Kawaguchi, Izumi (JP)

(73) Assignee: JTEKT Corporation, Osaka (JP)

( * ) Notice: Subject to any disclaimer, the term of this patent is extended or adjusted under 35 U.S.C. 154(b) by 911 days.

(21) Appl. No.: 12/149,994

(22) Filed: May 12, 2008

(65) Prior Publication Data

US 2008/0283338 A1 Nov. 20, 2008

(30) Foreign Application Priority Data

May 14, 2007 (JP) ................................ P2007-128539

(51) Int. Cl.
*F16D 3/41* (2006.01)
(52) U.S. Cl. .......................................... 464/11; 464/128
(58) Field of Classification Search .............. 464/11–14, 464/128; 384/368, 371, 390; 184/31
See application file for complete search history.

(56) References Cited

U.S. PATENT DOCUMENTS 5,695,405 A * 12/1997 Kono ............................ 464/128
6,827,494 B2 * 12/2004 Aguilar ..................... 384/368 X

FOREIGN PATENT DOCUMENTS

| JP | 54-089148(A) | 7/1979 |
|---|---|---|
| JP | 55-24243 | 2/1980 |
| JP | 55-36796 | 3/1980 |
| JP | 2000-145806 | 5/2000 |
| JP | 2006-112549(A) | 4/2006 |

* cited by examiner

*Primary Examiner* — Gregory Binda
(74) *Attorney, Agent, or Firm* — McGinn IP Law Group, PLLC

(57) ABSTRACT

A plurality of first oil passageways are recessed in an annular projected portion of a bearing cup of a cross shaft joint, each first oil passageway communicating with inner and outer periphery sides, and being increasing in groove width gradually from the outer periphery side toward the inner periphery side. A plurality of second oil passageways are recessed in the annular projected portion, and each second oil passageway is disposed between the first oil passageways, and communicates with the inner and outer periphery sides, and is decreasing in groove width gradually from the outer periphery side toward the inner periphery side. When the bearing cup is angularly moved relative to a cross shaft, grease in the first oil passageways is flowed from the outer periphery side of the annular projected portion to the inner periphery side thereof, while grease in the second oil passageways is flowed from the inner periphery side of the annular projected portion toward the inner periphery side.

8 Claims, 11 Drawing Sheets

CROSS SHAFT JOINT

BACKGROUND OF THE INVENTION

1. Field of the Invention

This invention relates to a cross shaft joint (universal joint) used in a drive shaft portion or a steering device of a vehicle.

2. Related Art

A cross shaft joint has been used in a drive shaft portion or other portions of a vehicle, and such a cross shaft joint comprises a cross shaft member having four shaft portions arranged in a cross-shape, and bearing cups of a closed-bottom cylindrical shape angularly movably fitted respectively on the shaft portions through rolling elements (rollers). A grease nipple is provided at a central portion of this cross shaft member, and grease supplied via this grease nipple is distributed to oil holes formed axially in the respective shaft portions. On the other hand, a central recess (communicating with the oil hole in the shaft portion) and an outer peripheral recess (in which one ends of the rolling elements are disposed) are formed in an inner bottom face of each bearing cup, and this inner bottom face further includes an annular projected portion formed between the central recess and the outer peripheral recess and held in sliding contact with an end face of the shaft portion. Oil passageways (oil grooves) are formed in this annular projected portion, and grease supplied to the central recess from the oil hole is flowed to the outer peripheral recess via the oil passageways, and also these oil passageways serve to hold the grease at the annular projected portion.

The rolling elements roll between an outer peripheral surface of the shaft portion and an inner peripheral surface of the bearing cup, and the end face of the shaft portion and the inner bottom face of the bearing cup slide relative to each other, so that the friction therebetween becomes large, and seizure due to lack of lubrication becomes a problem. Therefore, in JP-A-55-24243 and JP-UM-A-55-36796 mentioned below, the shape and pattern of oil passageways in the annular projected portion are so designed as to prevent seizure, etc.

JP-A-55-24243 discloses radial oil passageways 227 formed in an annular projected portion 222 formed on an inner bottom face 219 of a bearing cup 205 as shown in FIG. 10A, and also discloses oil passageways 227 extending radially while curved in a circumferential direction as shown in FIG. 10B. JP-UM-A-55-36796 discloses an oil passageway 227 extending in a spiral shape as shown in FIG. 10C.

JP-A-2000-145806 discloses a technique in which a resin washer having oil passageways is interposed between an inner bottom face of a bearing cup and an end face of a shaft portion so as to prevent seizure.

With respect to the oil passageways 227 shown in FIG. 10A, when the bearing cup 205 angularly moves about the shaft portion reciprocally (i.e., in opposite directions) in accordance with a rotation of a shaft coupled to the cross shaft joint, grease tends to flow from a central recess 220 to an outer peripheral recess 221 via the oil passageways 227 at an initial stage under the influence of the centrifugal force. However, after a continuous use, the flow of the grease reaches saturation, so that fresh grease can hardly flow into the oil passageways 227, and the grease held in the oil passageways 227 is repeatedly used for lubricating the sliding surfaces. Therefore, the grease is gradually deteriorated, and the lubricating performance is lowered.

On the other hand, with respect to the oil passageways of FIG. 10B and the oil passageway of FIG. 10C, the flowing of the grease can be promoted to a certain degree by the reciprocal angular movement of the bearing cup 205. Namely, each oil passageway 227 is circumferentially inclined relative to the radial direction or circumferentially intersects the radial direction. Therefore, when the bearing cup 205 angularly moves, for example, in a direction of arrow A, the flowing of grease into each oil passageway 227 from an inner peripheral end 227a thereof is promoted, and when the bearing cup 205 angularly moves in the opposite direction B, the flowing of the grease into the oil passageway 227 from an outer peripheral end 227b thereof is promoted.

However, the bearing cup 205 is merely repeatedly angularly moved through a predetermined angle in the directions of arrow A and B, and therefore the grease moves reciprocally in and along the oil passageway 227, so that the grease resides in the oil passageway 227, and thus can not be properly circulated.

SUMMARY OF THE INVENTION

This invention has been made in view of the above circumstances, and an object of the invention is to provide a cross shaft joint in which fresh lubricant is positively flowed so as to enhance a lubricating performance at a sliding contact area, thereby preventing seizure.

According to a first aspect of the present invention, there is provided a cross shaft joint comprising:

a cross shaft member having four shaft portions arranged in a cross-shape;

bearing cups of a closed-bottom cylindrical shape angularly movably fitted respectively on outer peripheral surfaces of said shaft portions through rolling elements, such that an inner bottom face of said bearing cup and an end face of the corresponding shaft portion abut against each other at annular sliding contact areas thereof each having a center disposed on an axis of angular movement of said bearing cup;

wherein a plurality of first oil passageways are recessed in one of said sliding contact areas of said bearing cup and said shaft portion, and each first oil passageway communicates with inner and outer periphery sides of said sliding contact area so as to increase a groove width gradually from said outer periphery side toward said inner periphery side such that opposed side faces of said first oil passageway are inclined with respect to a radial line passing through the axis of angular movement of said bearing cup, and lubricant is flowed from the outer periphery side of said sliding contact area toward the inner periphery side thereof via said plurality of first oil passageways when said bearing cup is angularly moved relative to said shaft portion in a circumferential direction; and a plurality of second oil passageways are recessed in said one sliding contact area, and each second oil passageway is disposed between said first oil passageways, and communicates with the inner and outer periphery sides of said sliding contact area so as to decrease a groove width gradually from said outer periphery side toward said inner periphery side such that opposed side faces of said second oil passageway are inclined with respect to a radial line passing through the axis of angular movement of said bearing cup, and the lubricant is flowed from the inner periphery side of said sliding contact area toward the outer periphery side thereof via said plurality of second oil passageways when said angular movement is effected.

In the cross shaft joint of this construction, when the bearing cup and the shaft portion are angularly moved relative to each other, the lubricant can be flowed from the outer periphery side of the sliding contact area to the inner periphery side thereof via the first oil passageways, and also the lubricant can be flowed from the inner periphery side of the sliding contact area to the outer periphery side thereof via the second oil passageways. Therefore, fresh lubricant can be positively supplied to the first and second oil passageways. Therefore, the ability of lubricating the area of contact between the inner bottom face of the bearing cup and the end face of the shaft portion can be enhanced, thereby preventing seizure.

According to a second aspect of the invention, there is provided across shaft joint comprising:

a cross shaft member having four shaft portions arranged in a cross-shape;

bearing cups of a closed-bottom cylindrical shape angularly movably fitted respectively on outer peripheral surfaces of said shaft portions through rolling elements, and interposition members each interposed between an inner bottom face of a respective one of said bearing cups and an end face of the corresponding shaft portion, and said interposition member abuts against at least one of said bearing cup and said shaft portion at at least one pair of annular sliding contact areas each having a center disposed on an axis of angular movement of said bearing cup that are formed between said interposition member and said bearing cup or said shaft portion; and a plurality of first oil passageways are recessed in one contact area in said at least one pair of sliding contact areas that are formed between said interposition member and said bearing cup or said shaft portion, and each first oil passageway communicates with inner and outer periphery sides of said sliding contact area so as to increase a groove width gradually from said outer periphery side toward said inner periphery side such that opposed side faces of said first oil passageway are inclined with respect to a radial line passing through the axis of angular movement of said bearing cup, and lubricant is flowed from the outer periphery side of said sliding contact area toward the inner periphery side thereof via said plurality of first oil passageways when said bearing cup, said shaft portion and said interposition member abutting against each other at sliding contact areas thereof are angularly moved relative to each other in a circumferential direction; and a plurality of second oil passageways are recessed in said one sliding contact area, and each second oil passageway is disposed between said first oil passageways, and communicates with the inner and outer periphery sides of said sliding contact area so as to decrease a groove width gradually from said outer periphery side toward said inner periphery side such that opposed side faces of said second oil passageway are inclined with respect to a radial line passing through the axis of angular movement of said bearing cup, and the lubricant is flowed from the inner periphery side of said sliding contact area toward the outer periphery side thereof via said plurality of second oil passageways when said angular movement is effected.

In the cross shaft joint of this construction, when the bearing cup and the interposition member are moved relative to each other and/or when the interposition member and the shaft portion are moved relative to each other, the lubricant can be flowed from the outer periphery side of the sliding contact area to the inner periphery side thereof via the first oil passageways, and also the lubricant can be flowed from the inner periphery side of the sliding contact area to the outer periphery side thereof via the second oil passageways. Therefore, fresh lubricant can be positively supplied to the first and second oil passageways. Therefore, the ability of lubricating the area of contact between the bearing cup and the interposition member, as well as the ability of lubricating the area of contact between the interposition member and the shaft portion, can be enhanced, thereby preventing seizure. Naturally, wear and seizure of the shaft portion and the bearing cup can also be suppressed.

In each of the above characteristic constructions, preferably, the first oil passageways and the second oil passageways are alternately arranged in the circumferential direction of the sliding contact area.

With this construction, circulating flows are effectively formed by the lubricant (flowing through the first oil passageways from the outer periphery side of the sliding contact area to the inner periphery side thereof) and the lubricant flowing through the second oil passageways from the inner periphery side of the sliding contact area to the outer periphery side thereof, and the circulation of the lubricant is positively effected. Therefore, the lubricating performance of the cross shaft joint is further enhanced.

In each of the above characteristic constructions, preferably, each of the first oil passageways extends such that the opposed side faces of the first oil passageway are symmetrically inclined in the circumferential direction with respect to the radial line passing through the axis of angular movement of the bearing cup.

With this construction, regardless of whether the above relative angular movement is effected in a normal direction or in a reverse direction, generally the same amount of lubricant can be flowed from the outer periphery side of the sliding contact area to the inner periphery side thereof via the first oil passageways.

In the cross shaft joint of the present invention, the lubricant is positively flowed through the sliding contact area where the end face of the shaft portion abuts against the inner bottom face of the bearing cup, and by doing so, the lubricating performance at the sliding contact area is enhanced, thereby preventing seizure.

DETAILED DESCRIPTION OF THE PREFERRED EMBODIMENTS

Figure 1:
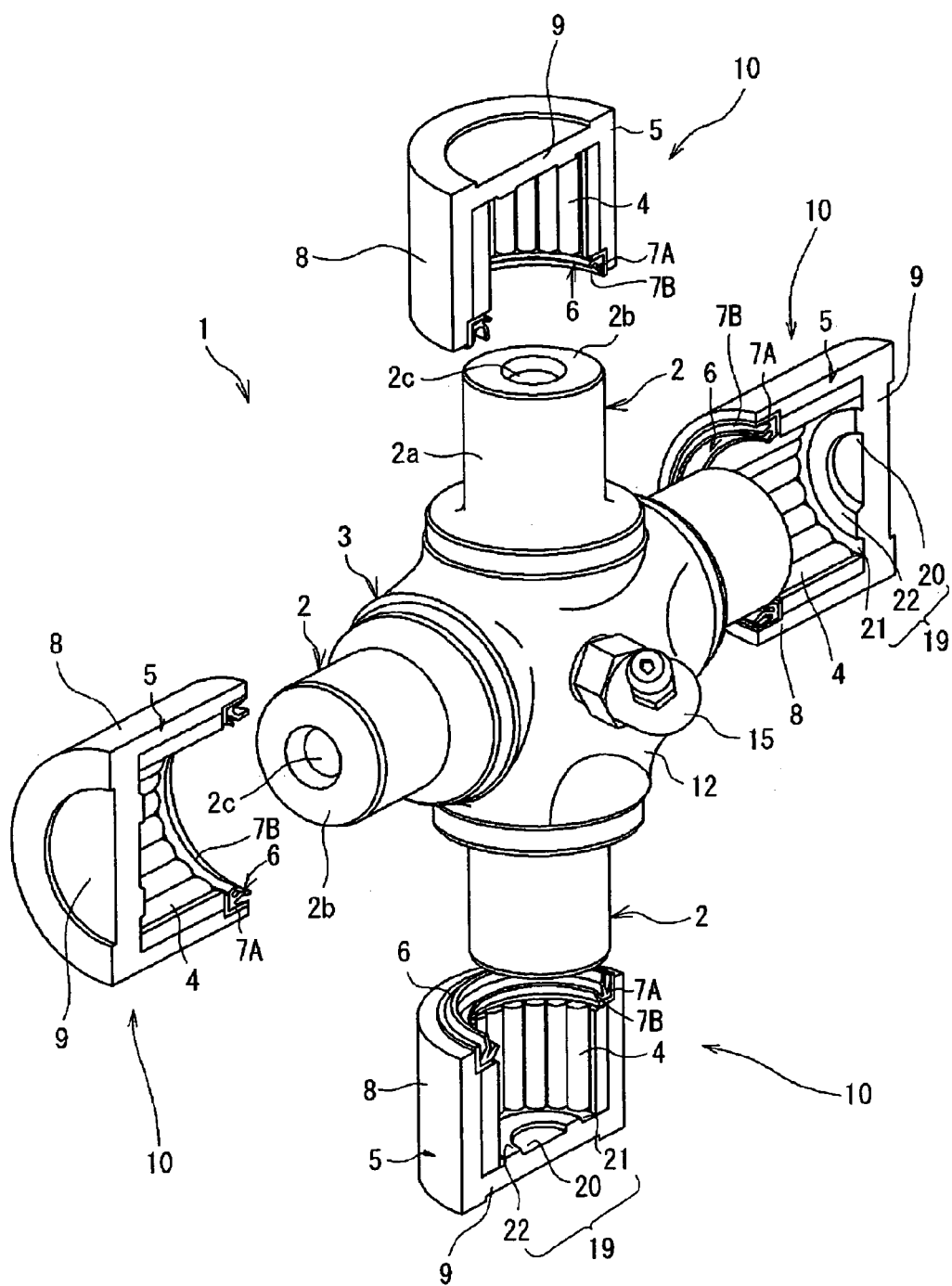
FIG. 1 is an exploded perspective view of a first embodiment of a cross shaft joint of the present invention.
Figure 9:
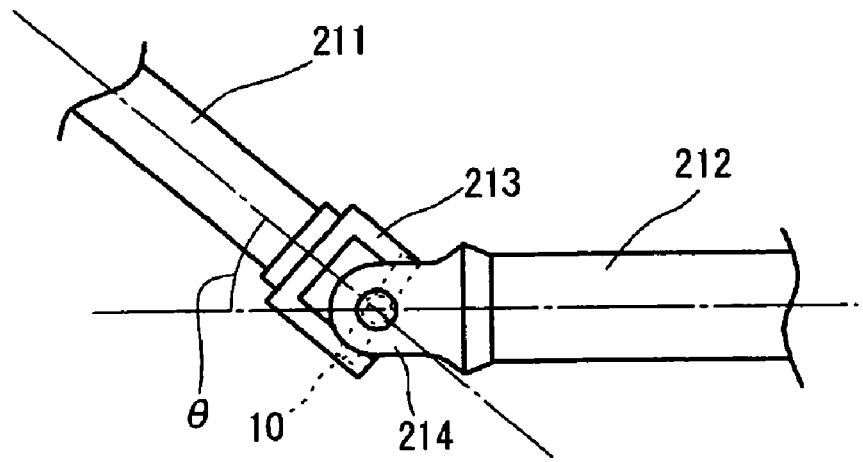
FIG. 9 is a side-elevational view of a portion of a drive shaft portion provided with a cross shaft joint of the invention.

FIG. 1 is an exploded perspective view of a first embodiment of a cross shaft joint of the present invention, particularly showing each bearing 10 in a half-cut condition. The cross shaft joint 1 of this embodiment comprises a cross shaft member 3 having four shaft portions 2, bearings 10 mounted respectively on the shaft portions 2, and seal members 6 each forming a seal between the bearing 10 and the shaft portion 2. This cross shaft joint 1 is used, for example, to interconnect two shafts 211 and 212 of a drive shaft portion or a steering device of a vehicle in a power-transmitting manner as shown in FIG. 9. These shafts 211 and 212 are interconnected through yoke members 213 and 214 (connected to the bearings 10) so as to be swingingly moved within a joint angle θ.

In FIG. 1, the cross shaft member 3 includes a body portion 12 disposed at the center thereof, and the four shaft portions 2 extending from the body portion 12 respectively in four directions such that two aligned shaft portions 2 are disposed perpendicular to the other two aligned shaft portions 2. A grease nipple 15 is provided at a central portion of the body portion 12, and grease (lubricant) poured from the grease nipple 15 is supplied to oil holes 2c formed axially in the respective shaft portions 2 and communicating with the grease nipple 15.

Figure 2:
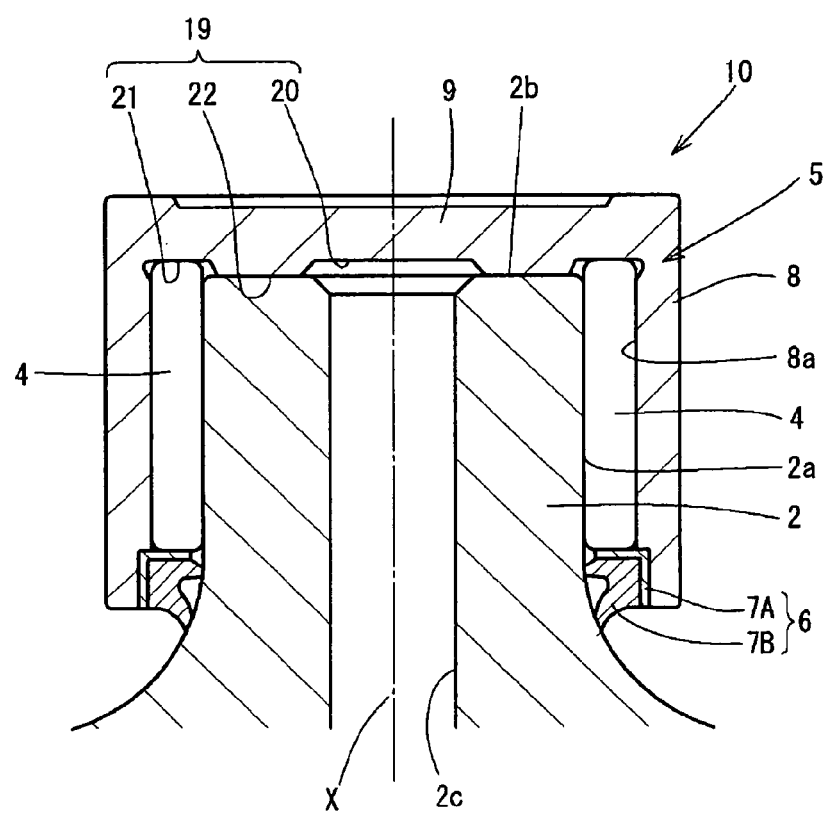
FIG. 2 is a cross-sectional view showing a shaft portion and a bearing on an enlarged scale.

FIG. 2 is an enlarged cross-sectional view showing the shaft portion 2 and the bearing 10. The bearing 10 comprises a bearing cup 5, and a number of cylindrical rollers (rolling elements) 4. The bearing cup 5 has a closed-bottom cylindrical shape, and includes a cylindrical portion 8, and a bottom portion 9 closing one axial end of the cylindrical portion 8. The cylindrical portion 8 of the bearing cup 5 is fitted on an outer peripheral surface 2a of the shaft portion 2 through the cylindrical rollers 4. Therefore, the cylindrical rollers 4 roll between an inner peripheral surface 8a of the cylindrical portion 8 (which serves as an outer ring raceway surface) and the outer peripheral surface 2a of the shaft portion 2 (which serves as an inner ring raceway surface), and therefore the bearing cup 5 can be rotated or angularly moved about the axis X of the shaft portion 2. An inner face (inner bottom face) 19 of the bottom portion 9 of the bearing cup 5 is opposed to an end face 2b of the shaft portion 2.

Figure 3:
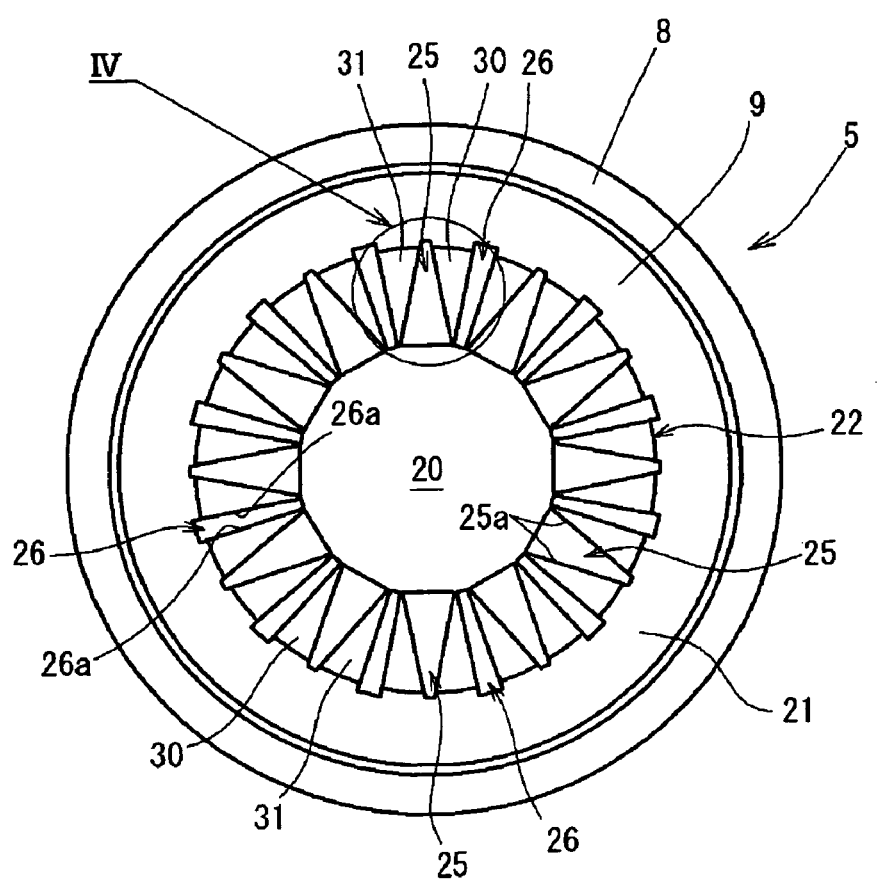
FIG. 3 is a plan view of an inner bottom face of a bearing cup.

FIG. 3 is a plan view of the inner bottom face 19 of the bearing cup 5. As shown in FIGS. 2 and 3, a central recess 20 of a generally circular shape having its center disposed on the axis X of angular movement of the bearing cup 5 is formed in a central portion of the inner face (inner bottom face) 19 of the bearing cup 5, and this central recess 20 is in communication with the oil hole 2c in the shaft portion 2. An annular projected portion (sliding contact area) 22 is formed around the outer periphery of the central recess 20, and a top face of this annular projected portion 22 serves as a sliding contact surface for sliding contact with the end face 2b of the shaft portion 2. An annular outer peripheral recess 21 is formed around the outer periphery of the annular projected portion 22, and one ends of the cylindrical rollers 4 are disposed at this outer peripheral recess 21.

As shown in FIG. 3, a plurality of groove-like oil passageways communicating the (inner periphery-side) central recess 20 and the (outer periphery-side) outer peripheral recess 21 are formed in the annular projected portion 22. More specifically, first land portions 30 and second land portions 31 are alternately formed on the annular projected portion 22 in the circumferential direction, and also first oil passageways 25 and second oil passageways 26 (which have a generally sector recess-shape or a generally rectangular recess-shape) are alternately formed in the annular projected portion 22 in the circumferential direction, that is, formed respectively in those areas of the annular projected portion 22 each lying between the adjacent first and second land portions 30 and 31. Grease supplied to the oil hole 2c in the shaft portion 2 flows to the central recess 20, and then fills in the oil passageways 25 and 26 in the annular projected portion 22, and further flows into the outer peripheral recess 21 to lubricate a space or region where the cylindrical rollers 4 are disposed. Also, in accordance with the angular movement of the bearing cup 5 about the axis X of the shaft portion 2, the grease held in the first and second oil passageways 25 and 26 is drawn into an area of contact between the sliding contact surfaces of the bearing cup 5 and shaft portion 2 to lubricate these sliding contact surfaces.

Figure 4:
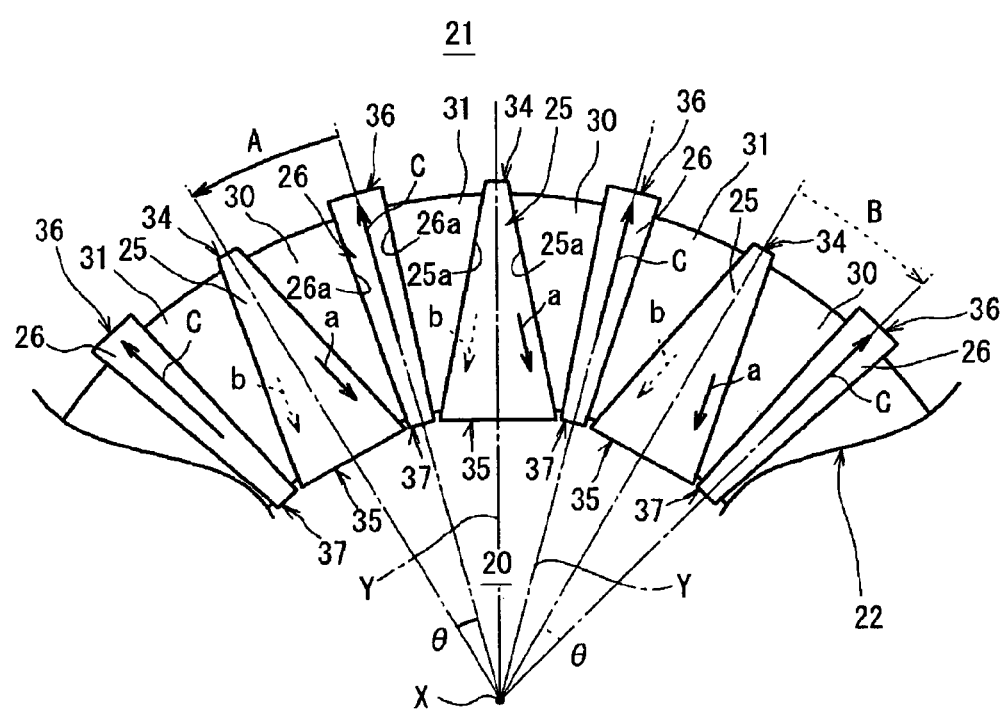
FIG. 4 is an enlarged view of a portion IV of FIG. 3.

FIG. 4 is an enlarged view of a portion IV of FIG. 3. In the following description, with respect to the circumferential direction of the annular projected portion 22 (the bearing cup 5), a left direction indicated by arrow A will be referred to as "one circumferential direction", while a right direction indicated by arrow B will be referred to as "the other circumferential direction".

Each first oil passageway 25 communicates the central recess 20 and the outer peripheral recess 21, and is increasing in width (groove width) gradually from the outer periphery side of the annular projected portion 22 toward the inner periphery side thereof (that is, radially inwardly) such that opposed side faces 25a of the first oil passageway 25 are symmetrically inclined with respect to a radial line Y passing through the axis X of angular movement of the bearing cup 5.

Each second oil passageway 26 communicates the central recess 20 and the outer peripheral recess 21, and is decreasing in width (groove width) gradually from the outer periphery side of the annular projected portion 22 toward the inner periphery side thereof (that is, radially inwardly) such that opposed side faces 26a of the second oil passageway 26 are symmetrically inclined with respect to a radial line Y passing through the axis X of angular movement of the bearing cup 5.

The angle of inclination of each side face 25a of the first oil passageway 25 relative to the radial line Y, as well as the angle of inclination of each side face 26a of the second oil passageway 26 relative to the radial line Y, is so determined that grease existing in the first oil passageway 25 flows toward the inner periphery of the annular projected portion 22 against the centrifugal force when the bearing cup 5 angularly moves relative to the shaft portion 2. More specifically, these inclination angles are determined taking the joint angle θ, the radial length, the peripheral speed, etc., into consideration. For example, with the ordinary joint angle (θ=5° to 15°), the angle of inclination of the inclined surface (side face) 25a of the first oil passageway 25 relative to the radial line Y can be set to about 5° to about 30°.

Also, the angle of inclination of each side face 26a of the second oil passageway 26 relative to the radial line Y is so determined that when the bearing cup 5 angularly moves relative to the shaft portion 2, grease existing in the second oil passageway 26 flows toward the outer periphery of the annular projected portion 22 with the aid of the centrifugal force acting on this grease. More specifically, this inclination angle can be set to 0° to 15°.

The bearing cup 5 is formed by pressing (deep drawing), using carbon steel for machine construction (such as chromium steel) as a material, and the annular projected portion 22, the recesses 20 and 21 and the oil passageways 25 and 26 are formed by a die simultaneously when forming the bearing cup 5 by pressing. The bearing cup may be formed by the use of a punching die or may be formed by lathe turning. All of the oil passageways 25 and 26 can have the same depth, and for example can be formed into a depth of about 0.1 mm to about 0.5 mm, taking into consideration a load on the land portions 30 and 31 and wear developing during use.

Next, the flow of grease in each oil passageway 25, 26 will be described. The end face 2b of the shaft portion 2 for sliding movement relative to the bearing cup 5 is formed into a flat surface so as to be always held in contact with the top surfaces of all of the first and second land portions 30 and 31. When the bearing cup 5 is angularly moved in the direction of arrow A (in the one circumferential direction) about the shaft portion 2 (FIG. 2) as shown in FIG. 4, grease existing in each first oil passageway 25 is drawn toward the right side face 25a (FIG. 4) by a shearing resistance developing between this grease and the grease-deposited on the end face 2b of the shaft portion 2, and moves along this side face 25a radially inwardly toward the inner periphery side of the annular projected portion 22. Namely, flows indicated by solid lines a in FIG. 4 develop. Therefore, the grease existing in that portion of the first oil passageway 25 disposed near to the central recess 20 is discharged to the central recess 20 via a first discharge port 35. As a result, by a pressure reducing action caused by the discharge of the grease to the central recess 20, the grease existing at that portion of the second land portion 31 disposed near to the outer peripheral recess 21 is drawn into the first oil passageway 25 via a first introduction port 34.

On the other hand, the second oil passageways 26 are the radial grooves each decreasing in groove width gradually toward the central recess 20, and therefore when the bearing cup 5 is angularly moved in the direction of arrow A (in the one circumferential direction) about the shaft portion 2 (FIG. 2), grease existing in each second oil passageway 26 is drawn toward the right side face 26a (FIG. 4) by a shearing resistance developing between this grease and the grease deposited on the end face 2b of the shaft portion 2, and moves along this right side face 26a radially outwardly toward the outer periphery side of the annular projected portion 22 with the aid of the centrifugal force acting on this grease. Namely, flows indicated by solid lines c in FIG. 4 develop. Therefore, the grease existing in that portion of the second oil passageway 26 disposed near to the outer peripheral recess 21 is discharged to the outer peripheral recess 21 via a second discharge port 36. As a result, by a pressure reducing action caused by the discharge of the grease to the outer peripheral recess 21, the grease existing at that portion of the first land portion 30 disposed near to the central recess 20 is drawn into the second oil passageway 26 via a second introduction port 37.

In this embodiment, the opposed side faces 25a of each first oil passageway 25, as well as the opposed side faces 26a of each second oil passageway 26, are symmetrically inclined with respect to the radial line Y as shown in FIG. 4, and therefore even when the bearing cup 5 is angularly moved in the other circumferential direction (in the direction of arrow B), a positive circulation of the grease at the surface of the annular projected portion 22 is maintained by the combination of a flow of the grease (see a broken line b in FIG. 4) from the outer peripheral recess 21 toward the central recess 20 via each first oil passageway 25 and a flow of the grease (see the solid line c in FIG. 4) from the central recess 20 toward the outer peripheral recess 21 via each second oil passageway 26 as when the bearing cup 5 is angularly moved in the direction of arrow A. And besides, the first oil passageways 25 and the second oil passageways 26 are alternately arranged in the circumferential direction of the annular projected portion 22, and therefore a circulating flow of grease going around each land portion 30, 31 between the adjacent first and second oil passageways 25 and 26 is liable to develop, and fresh grease is positively supplied to the oil passageways.

Thus, the grease flows only in one direction through the first oil passageway 25, and also the grease flows only in one direction through the second oil passageway 26, and therefore the ability of flowing the grease is more enhanced as compared with the case where grease flows reciprocally through each oil passageway. Therefore, fresh grease is positively supplied to the first and second oil passageways 25 and 26, and the lubricating ability at the area of sliding contact between the inner bottom face 19 of the bearing cup 5 and the end face 2b of the shaft portion 2 is enhanced. Therefore, seizure can be suitably prevented, and besides this construction can meet a high-speed rotation.

Furthermore, by flowing the lubricant back from the outer periphery side of the sliding contact area toward the inner periphery side thereof, an excessive residence of the lubricant at the outer periphery side of the sliding contact area can be suppressed. Therefore, the grease is prevented from being excessively collected on the peripheral surface of the shaft portion, and therefore leakage of the grease from the seal member can be suppressed.

In addition, the area of sliding contact between the bearing cup 5 and the end face 2b of the shaft portion 2 can be sufficiently lubricated through the first and second oil passageways 25 and 26, and therefore there is no need to interpose a resin washer or the like between the two, and the cross shaft joint can be formed into the compact construction at a low cost. And besides, this cross shaft joint has the simple shape, and therefore a die for forming it can be easily produced, and also the yield is high, and therefore a good mass-productivity is achieved.

Incidentally, the first and second oil passageways 25 and 26 do not always need to be formed in the inner bottom face 19 of the bearing cup 5, but can be formed in the end face 2b of the shaft portion 2. However, from the viewpoint of machinability, it is more advantageous to form these oil passageways in the bearing cup 5.

Figure 5:
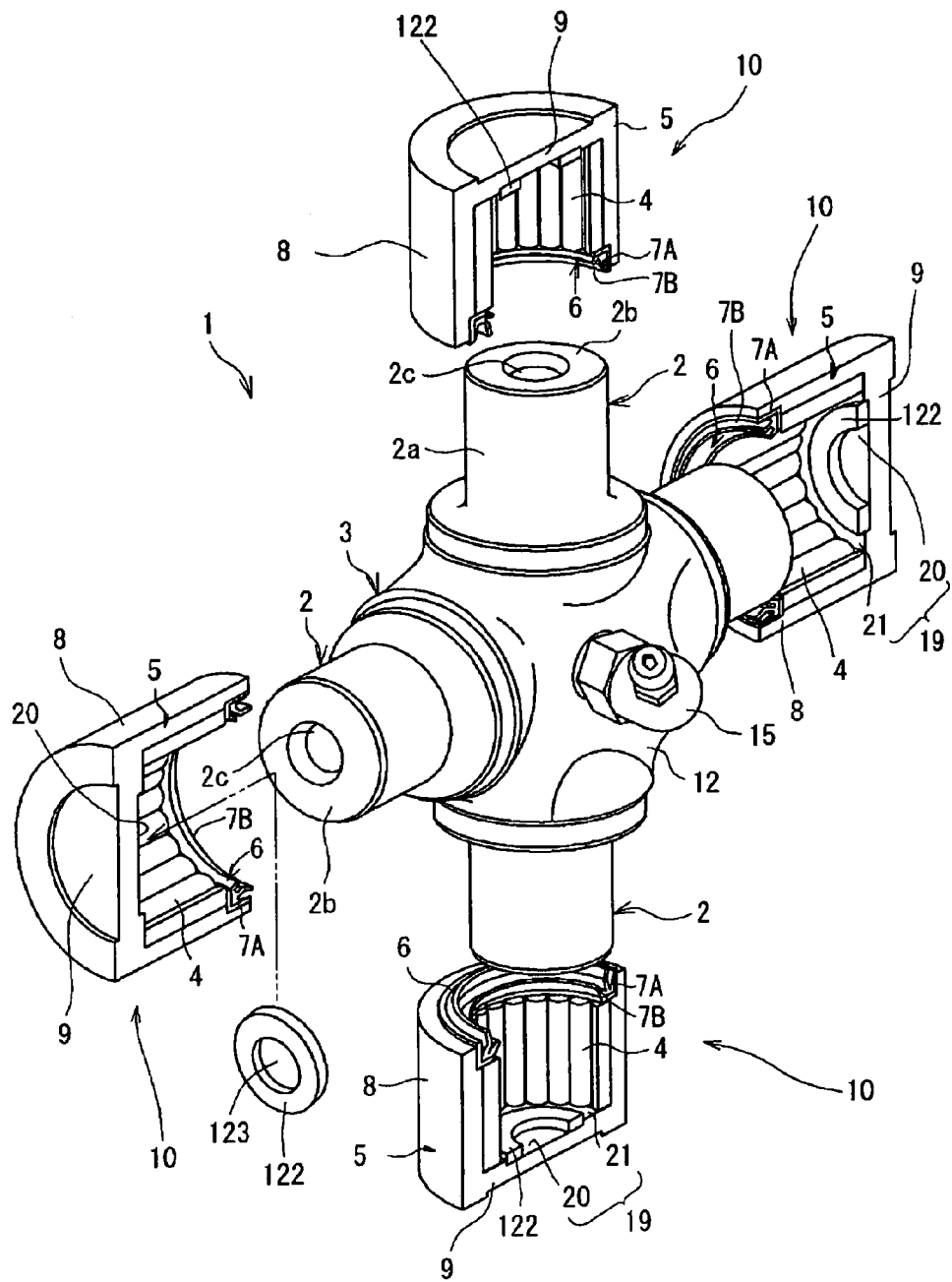
FIG. 5 is an exploded perspective view of a second embodiment of a cross shaft joint of the invention.

FIG. 5 is an exploded perspective view of a second embodiment of a cross shaft joint of the invention. This second embodiment differs from the above-mentioned first embodiment in that a thrust washer (interposition member) 122 is interposed between a bearing cup 5 and an end face 2b of a shaft portion 2 and that first oil passageways 25 and second oil passageways 26 are formed in this thrust washer 122. In this second embodiment, those portions identical in construction to the corresponding portions of the first embodiment will be designated by identical reference numerals, respectively, and detailed description thereof will be omitted.

The thrust washer 122 has a disk-like annular shape, and has a hole 123 formed through a central portion thereof. This thrust washer 122 is fitted in a central recess 20 in the bearing cup 5. Namely, the thrust washer 122 has a diameter generally equal to a diameter of the central recess 20, and an outer peripheral surface 122a of the thrust washer 122 is held against an inner peripheral surface 20a of the central recess 20, and one end face 122b of the thrust washer 122 is held against an inner end face 20b of the central recess 20. The thrust washer 122 is thus fitted in the central recess 20, and is angularly moved together with the bearing cup 5.

Figure 6:
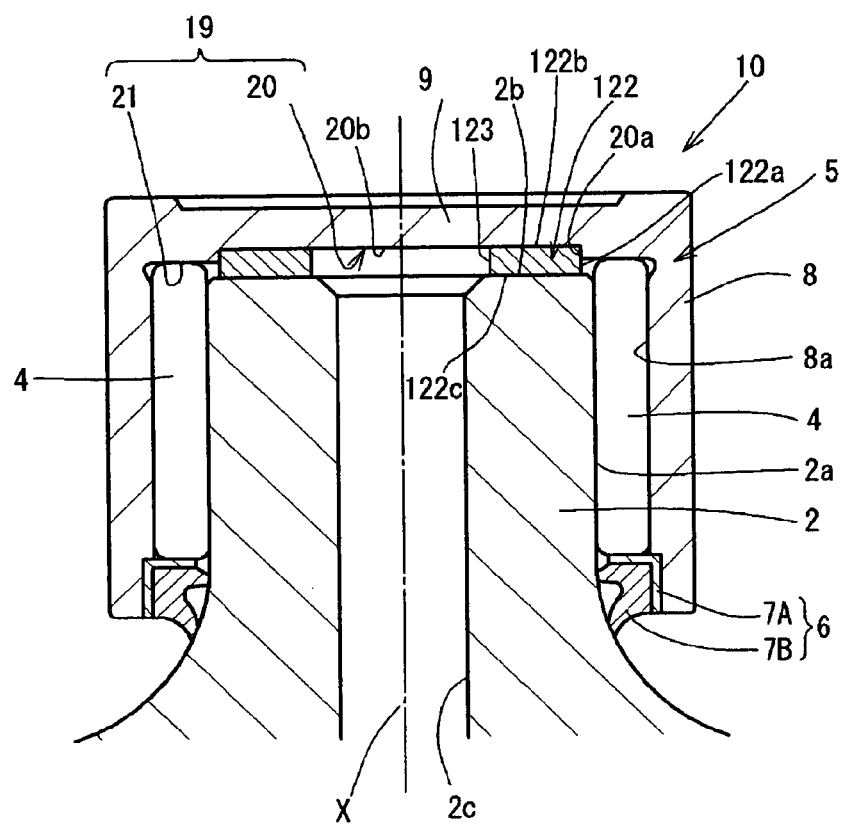
FIG. 6 is a cross-sectional view showing a shaft portion and a bearing on an enlarged scale.

The thrust washer 122 has a thickness larger than a depth of the central recess 20 of the bearing cup 5, and projects toward the shaft portion 2 beyond an outer peripheral convex portion 21 of the bearing cup 5, and an end face 122c of the thrush water 122 facing the shaft portion 2 is held against the end face 2b of the shaft portion 2 (see FIG. 6). Therefore, in this embodiment, the thrust washer 122 itself forms a sliding contact area, and its end face 122c defines the sliding contact surface for sliding contact with the end face 2b of the shaft portion 2.

The hole 123 in the thrust washer 122 is in communication with an oil hole 2c in the shaft portion 2, and therefore the central recess 20 is also in communication with the oil hole 2c via the hole 123.

The thrush washer 122 is made of a resin having a good lubricating ability. However, the thrust washer 122 can be made of metal (e.g. copper or a copper alloy) with a good lubricating ability, and in order to enhance the lubricating ability of the surface of the thrust washer 122, a surface treatment (such for example as a hardening treatment) can be applied to this surface, or a solid lubricant can be coated on the surface, or a coating can be formed on the surface.

Figure 7:
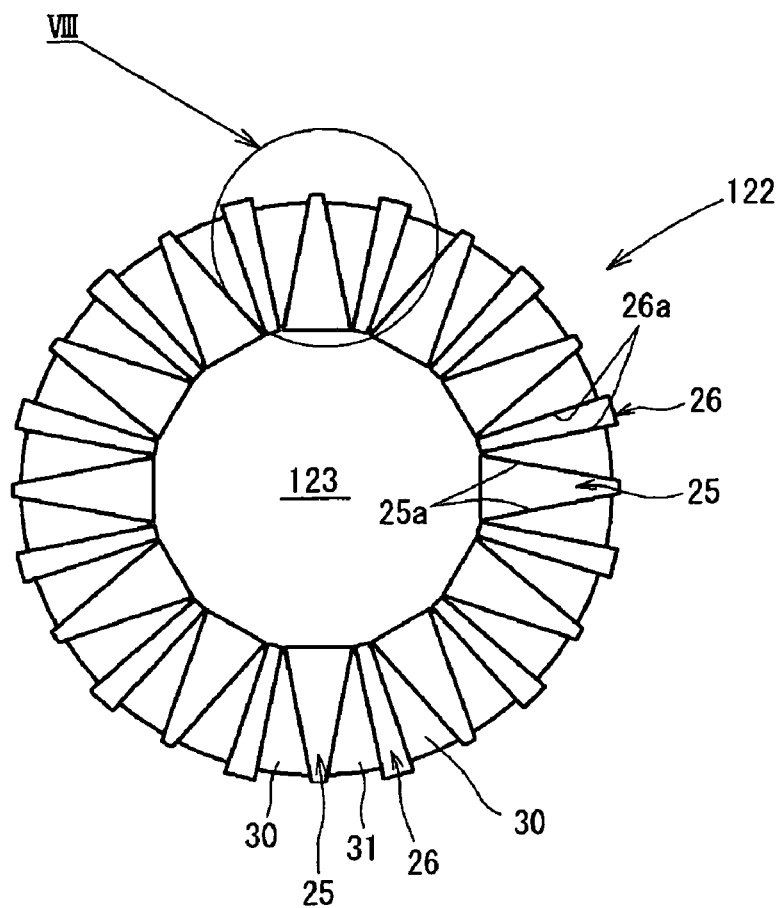
FIG. 7 is a plan view of an end face of a thrust washer.
Figure 8:
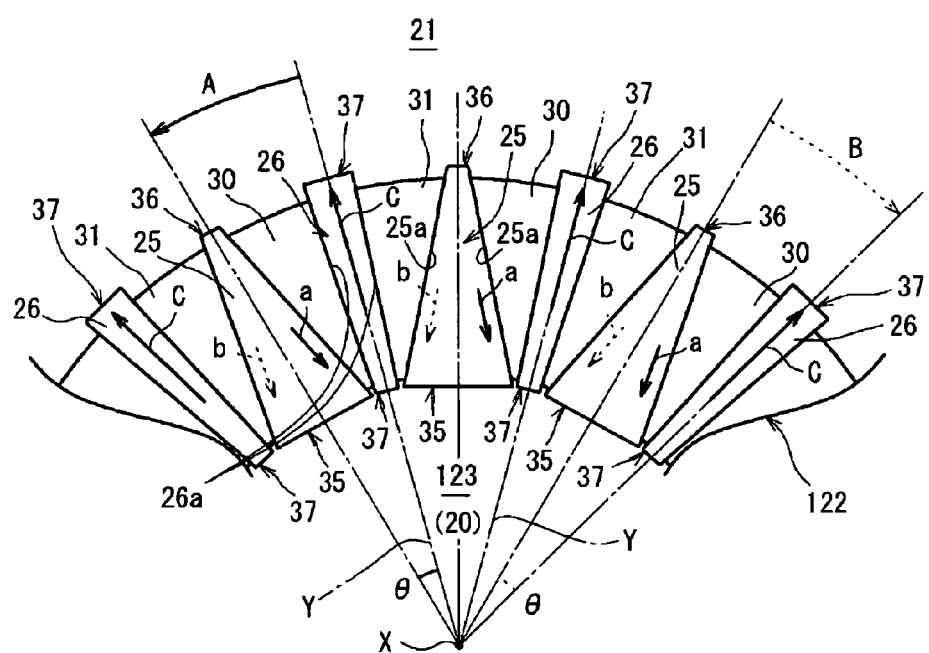
FIG. 8 is an enlarged view of a portion VIII of FIG. 7.

FIG. 7 is a plan view of the end face 122c of the thrust washer 122 facing the shaft portion 2, and FIG. 8 is an enlarged view of a portion VIII of FIG. 7. The first oil passageways 25 and the second oil passageways 26 which communicate the inner periphery side and outer periphery side of the thrust washer 122 are formed in the end face 122c of the thrust washer 122 facing the shaft portion 2, and first and second land portions 30 and 31 are formed respectively on those areas of the end face 122c each lying between the adjacent first and second oil passageways 25 and 26. The first and second oil passageways 25 and 26 and the first and second land portions 30 and 31 are identical in structure to those of the first embodiment shown in FIG. 4. Grease supplied to the oil hole 2c in each shaft portion 2 passes through the hole 123 of the thrust washer 122, and fills in the oil passageways 25 and 26, and an excess grease flows to the outer peripheral convex portion 21 to lubricate a space or region where cylindrical rollers 4 are disposed (see FIG. 6). Also, in accordance with the angular movement of the bearing cup 5 about an axis X of the shaft portion 2, the grease held in the oil passageways 25 and 26 is drawn into the area (sliding contact surfaces) of sliding contact between the end face 2b of the shaft portion 2 and the end face 122c of the thrust washer 122, thereby lubricating these sliding contact surfaces.

The grease flows only in one direction through the first oil passageway 25, and also the grease flows only in one direction through the second oil passageway 26, and therefore the ability of flowing the grease can be more enhanced as compared with the case where grease flows reciprocally through each oil passageway. Therefore, fresh grease is positively supplied to the first and second oil passageways 25 and 26, and the lubricating ability at the area of sliding contact between the end face 2b of the shaft portion 2 and the end face 122c of the thrust washer 122 is enhanced, and seizure can be suitably prevented.

Furthermore, in this embodiment, the thrust washer 122 itself has the lubricating ability, and in addition the ability of flowing the grease is enhanced by the oil passageways 25 and 26, thereby sufficiently lubricating the sliding contact surfaces of the thrust washer 122 and shaft portion 2, and therefore wear and seizure of the shaft portion 2 and bearing cup 5 can be further suppressed.

First and second oil passageways 25 and 26 and first and second land portions 30 and 31 as described above for the end face 122c of the thrust washer 122 are also formed at the end face 122b of the thrush washer 122 facing the central recess 20. Namely, when the thrust washer 122 shown in FIG. 7 is turned 180 degrees, that is, reversed, the oil passageways 25 and 26 formed in the end face 122b and having the same shapes as the passageways 25 and 26 of FIG. 7 can be seen. Therefore, it is not necessary to select the direction (or the side) of the thrush washer 122 at the time of fitting the thrust washer 122 to the bearing cup 5, and therefore the thrust washer can be easily mounted on the bearing cup.

However, the oil passageways 25 and 26 may be formed only in the end face 122c of the thrust washer 122, in which case the thrust washer 122 is fitted to the bearing cup 5, with the end face 122c held in contact with the end face 2b of the shaft portion 2.

The oil passageways 25 and 26 can be formed by pressing or by the use of a punching die, or depending on the material to be used, these passageways may be formed by casting or injection molding or may be formed by cutting.

Furthermore, in the second embodiment, oil passageways 25 and 26 may be formed in the end face 2b of the shaft portion 2 without forming the oil passageways 25 and 26 in the end face of the thrush washer 122.

Furthermore, the thrust washer 122 can be fitted to the end face 2b of the shaft portion 2. Namely, in this case, a central recess is formed in the end face 2b of the shaft portion 2, and the thrust washer 122 is fitted in this central recess, and is fixed thereto, and the oil passageways 25 and 26 are formed in the end face 122b of the thrust washer 122 facing the bearing cup 5, and the central recess and an outer peripheral recess communicate with each other via the oil passageways 25 and 26. In this case, when the oil passageways 25 and 26 are formed in each end face of the thrust washer 122, it is not necessary to select the direction (or the side) of the thrush washer 122 at the time of fitting the thrust washer 122 to the end face 2b of the shaft portion 2, and therefore this is desirable.

Furthermore, in the case where the thrust washer 122 is fitted to the end face 2b of the shaft portion 2, oil passageways 25 and 26 may be formed in the inner bottom face 19 of the bearing cup 5 as in the first embodiment without forming the oil passageways 25 and 26 in the thrust washer 122.

In the case where the thrust washer 122 is not fixed to either of the bearing cup 5 and the shaft portion 2, and is slidable relative to the two, oil passageways 25 and 26 are formed in one of sliding contact areas defined respectively by the end face 122b of the thrust washer 122 and the inner bottom face 19 of the bearing cup 19, and also oil passageways 25 and 26 are formed in one of sliding contact areas defined respectively by the end face 122c of the thrust washer 122 and the end face 2b of the shaft portion 2.

Figure 10A:
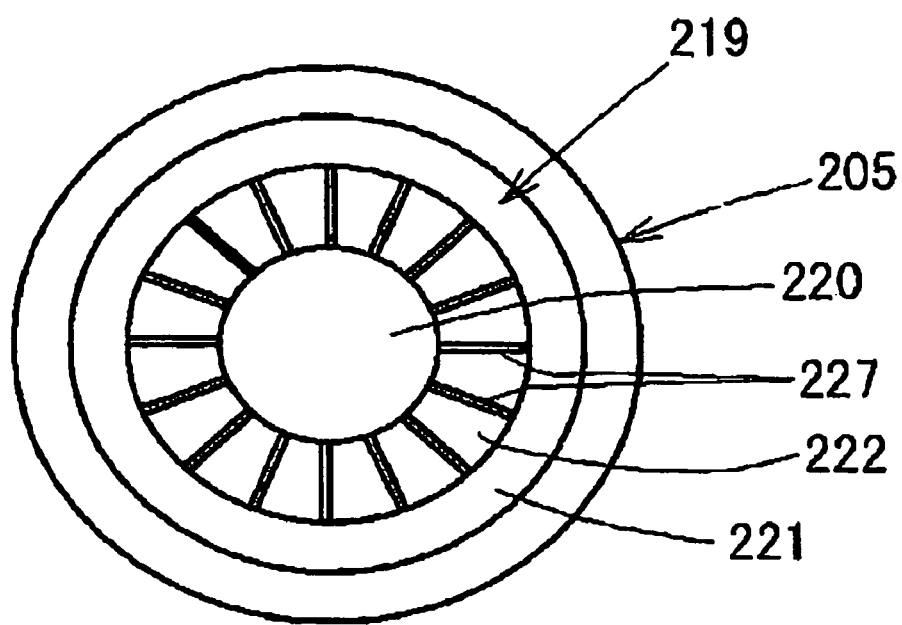
FIGS. 10A to 10C are plan views of an inner bottom face of a conventional bearing cup.
Figure 10B:
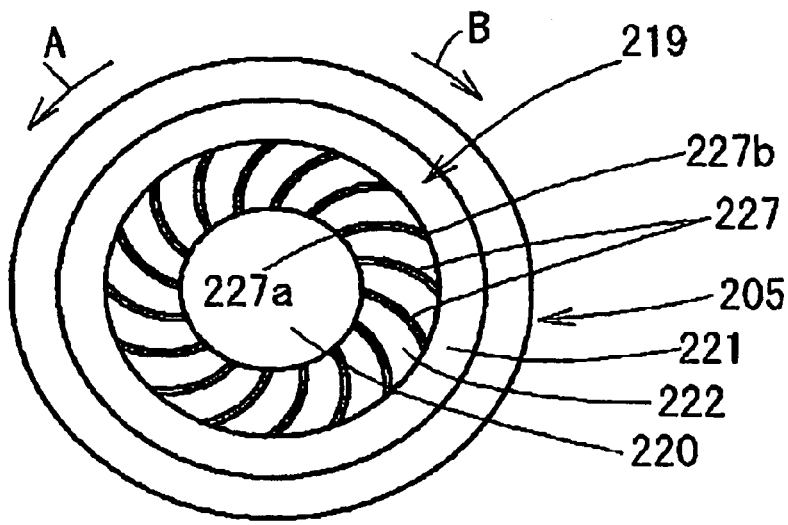
Figure 10C:
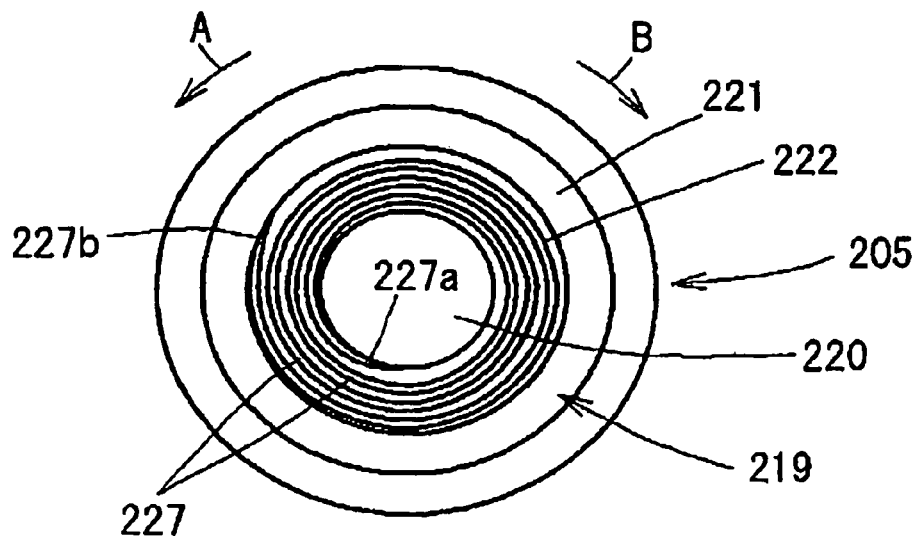

In the case of the conventional technique shown in FIG. 10A, when the bearing cup 205 is angularly moved about the shaft portion, the flowing of the grease from the inner periphery side of the annular projected portion 222 toward the outer periphery side thereof is promoted. However, when the amount of flow of the grease to the outer periphery side becomes excessive, it is feared that the grease may leak through a seal member (corresponding to the seal member 6 in FIG. 2) to the exterior of the bearing cup 205 despite the fact that fresh grease is not supplied from a grease nipple.

In each of the first and second embodiments, there will not be encountered a situation in which the grease flows only from the inner periphery side to the outer periphery side, but the flowing of the grease from the outer periphery side of the annular projected portion 22 (or the thrust washer 122) to the inner periphery side thereof is effected through the first oil passageways 25. Therefore, the grease is prevented from excessively residing at the outer periphery side, and therefore the possibility of leakage of the grease from the seal member 6 becomes remote.

When the bearing cup 5 is angularly moved through a predetermined angle, the amount of movement of the outer periphery side of the annular projected portion 22 (or the thrust washer 122) is larger than the amount of movement of the inner periphery side thereof. Therefore, when the bearing cup 5 is angularly moved in one direction (for example, in the direction of arrow A in FIG. 4 or FIG. 8), the amount of flow of the grease from the outer periphery side of the annular projected portion 22 (or the thrust washer 122) to the inner periphery side thereof via the first oil passageways 25 is larger than the amount of flow of the grease from the inner periphery side of the annular projected portion 22 (or the thrust washer 122) to the outer periphery side thereof via the second oil passageways 26. With this operation, also, the amount of flow of the grease to the outer periphery side of the bearing cup 5 can be suppressed, thereby preventing leakage of the grease from the seal member 6.

The present invention is not limited to the above embodiments.

For example, in addition to the first oil passageways 25 and the second oil passageways 26 which are formed in the annular projected portion 22 (in the first embodiment), the thrust washer 122 (in the second embodiment), etc., and are in communication with the central recess 20, the hole 123 of the thrust washer 122 and the outer peripheral recess 21, other oil passageways may be formed. For example, an inner peripheral oil passageway and an outer peripheral oil passageway which have an annular or circular shape and communicate with the first and second oil passageways 25 and 26 can be formed respectively in the inner and outer peripheral portions of the annular projected portion 22 or the thrust washer 122. With this construction, the area where grease can reside is provided, and the supply of the grease from the first and second passageways 25 and 26 and the discharge of the grease from the oil passageways 25 and 26 can be effected smoothly.

Each of the above oil passageways can have a suitable depth, but by forming the inner peripheral oil passageway and/or the outer peripheral oil passageway which have the same depth as that of the first and second oil passageways 25 and 26, the grease can be more smoothly flowed into the first oil passageways 25 and the second oil passageways 26.

In the first and second embodiments, although the first oil passageways 25 and the second oil passageways 26 are alternately arranged, they are not limited to this arrangement. For example, in order to positively flow the grease back to the central recess 20, the number of the first oil passageways 25 may be made larger than the number of the second oil passageways 26.

Furthermore, in order to secure the sufficient contact area at the sliding contact area or surface 22, a convex portion which will not prevent the flow of the grease may be formed at a radially-inner portion of each first oil passageway 25.

What is claimed is:

1. A cross shaft joint comprising:
a cross shaft member including four shaft portions arranged in a cross-shape;
plural bearing cups of a closed-bottom cylindrical shape angularly movably fitted respectively on outer peripheral surfaces of said shaft portions through rolling elements, such that an inner bottom face of a bearing cup of said plural bearing cups and an end face of the corresponding shaft portion abut against each other at annular sliding contact areas thereof each having a center disposed on an axis of angular movement of said bearing cup;
wherein a plurality of first oil passageways are recessed in one of said sliding contact areas of said bearing cup and said shaft portion, and each first oil passageway communicates with inner and outer periphery sides of said sliding contact area so as to increase a groove width gradually from said outer periphery side toward said inner periphery side such that opposed side faces of said first oil passageway are inclined with respect to a radial line passing through the axis of angular movement of said bearing cup, and lubricant is flowed from the outer periphery side of said sliding contact area toward the inner periphery side thereof via said plurality of first oil passageways when said bearing cup is angularly moved relative to said shaft portion in a circumferential direction, and
a plurality of second oil passageways are recessed in said one sliding contact area, and each second oil passageway is disposed between said first oil passageways, and communicates with the inner and outer periphery sides of said sliding contact area so as to decrease a groove width gradually from said outer periphery side toward said inner periphery side such that opposed side faces of said second oil passageway are inclined with respect to a radial line passing through the axis of angular movement of said bearing cup, and the lubricant is flowed from the inner periphery side of said sliding contact area toward the outer periphery side thereof via said plurality of second oil passageways when said angular movement is effected.

2. A cross shaft joint according to claim 1, wherein said first oil passageways and said second oil passageways are alternately arranged in the circumferential direction of said sliding contact area.

3. A cross shaft joint according to claim 1, wherein each of said first oil passageways extends such that the opposed side faces of said first oil passageway are symmetrically inclined in the circumferential direction with respect to the radial line passing through the axis of angular movement of said bearing cup.

4. A cross shaft joint according to claim 1, wherein the opposed side faces of said first oil passageway are symmetrically inclined with respect to the radial line passing through the axis of angular movement of said bearing cup.

5. A cross shaft joint according to claim 1, wherein the opposed side faces of said second oil passageway are symmetrically inclined with respect to the radial line passing through the axis of angular movement of said bearing cup.

6. A cross shaft joint according to claim 1, wherein the first oil passageways extend from a radially innermost periphery of said sliding contact area to a radially outermost periphery of said sliding contact area.

7. A cross shaft joint according to claim 1, wherein the second oil passageways extend from a radially innermost periphery of said sliding contact area to a radially outermost periphery of said sliding contact area.

8. A cross shaft joint according to claim 1, wherein a depth of the first oil passageways is substantially the same as a depth of the second oil passageways.

* * * * *